United States Patent
Nishihata et al.

[11] Patent Number: 6,095,777
[45] Date of Patent: Aug. 1, 2000

[54] HERMETIC COMPRESSOR HAVING AN INLET PORT AND/OR AN OUTLET PORT WITH A SEALED CONNECTING MEMBER

[75] Inventors: Hideo Nishihata, Otsu; Norio Yoshida, Moriyama, both of Japan

[73] Assignee: Matsushita Electric Industrial Co., Ltd., Osaka-fu, Japan

[21] Appl. No.: 09/042,620

[22] Filed: Mar. 17, 1998

[30] Foreign Application Priority Data

Jul. 22, 1997 [JP] Japan .................................. 9-195876

[51] Int. Cl.[7] ........................... F04C 29/00; F16L 19/00; F16L 23/028
[52] U.S. Cl. ................. 418/55.1; 418/270; 285/141.1; 285/142.1; 285/368
[58] Field of Search .................... 418/55.1, 55.4, 418/270; 417/902; 285/139.2, 139.3, 141.1, 142.1, 368

[56] References Cited

U.S. PATENT DOCUMENTS

| | | | |
|---|---|---|---|
| 3,834,846 | 9/1974 | Linder et al. ........................... | 418/270 |
| 4,437,820 | 3/1984 | Terauchi et al. ....................... | 418/55.4 |
| 5,163,716 | 11/1992 | Bolton et al. ........................ | 285/142.1 |
| 5,232,355 | 8/1993 | Fujii et al. ............................. | 418/55.4 |
| 5,868,438 | 2/1999 | Svetlik ................................... | 285/368 |

*Primary Examiner*—John J. Vrablik
*Attorney, Agent, or Firm*—Wenderoth, Lind & Ponack, L.L.P.

[57] ABSTRACT

A connector 30 is integrated in a hermetic compressor 10. A flange block 48 is secured on the connector 30 by a screw 62. The connector 30 and the flange block 48 have through-holes 38 and 50, respectively, and a tube 54 is inserted into through-hole 50. A flange 58 is integrally formed in a peripheral surface of one end portion of the tube 54. Also, an elastic ring 60 is fitted near the flange 58. The flange 58 and the elastic ring 60 are positioned in enlarged diameter portions 40 and 42 formed in the connector 30 so that the ring 60 seals against the tube 54 and the connector 30. With this arrangement, simply by tightening the screw using a screwdriver, the tube can be securely connected with the container.

4 Claims, 4 Drawing Sheets

HERMETIC COMPRESSOR HAVING AN INLET PORT AND/OR AN OUTLET PORT WITH A SEALED CONNECTING MEMBER

FIELD OF THE INVENTION

The present invention generally relates Mimetic compressor and, more particularly, to a hermetic compressor for use with an automotive air-conditioner.

BACKGROUND OF THE INVENTION

FIG. 5 shows a prior art electric driven compressor for use with an automotive air-conditioner. The compressor, generally indicated by reference numeral 100, has a pressure-resisting container 102. The container 102 includes a hollow cylinder 104 and shells 106, 108 arranged at opposite ends of the cylinder portion 104. The shells 106, 108 are connected with corresponding ends of the cylinder 104 through annular gaskets 110, 112 by the use of bolts 114, 116, respectively. However, this fails to prevent a compressive medium from leaking across the gaskets 110, 112.

FIG. 6 shows another prior art automotive electric driven compressor generally indicated by reference numeral 200. In this compressor 200, a plurality of members are integrated by welding into an enclosed container and therefore no compressive medium can leak from the container which would be experienced in aforementioned electric compressor 100.

The electric compressor 200 has an inlet port 204 for drawing the compressive medium having a lower pressure into the pressure resisting container 202 and an outlet port 206 for discharging the compressive medium having a higher pressure out of the container 202. Each of the inlet and outlet ports 204, 206 includes a tube 208 fixedly connected at one end thereof by welding to the container 202, and a connecting member or bushing 210 connected at one end thereof to the other end of the tube 208. The bushing 210 is formed at an inner surface of the other end thereof with an inner thread. Further, another connecting member or tube (not shown) having an outer thread in one end thereof is connected with the associated inner thread of the bushing 210.

According to this arrangement, the connecting members need to be connected to each other using a spanner. However, when the electric compressor 200 is installed within a restricted space, e.g., adjacent to an engine unit under the hood, lots of other units and tube arranged in the neighborhood thereof restrict the operation of the spanner, rendering the installation of the compressor more difficult. Further, a breaking can occur at the connecting portion of the tube 208 due to vibration transmitted from other members such as the engine unit.

SUMMARY OF THE INVENTION

Accordingly, an object of the invention is to provide an electric compressor that allows tubes to be connected with ease and free from leakage of the compressive medium.

To this end, a hermetic compressor of the present invention includes an enclosed container made of metal, the container having an inlet port for drawing a refrigerant into the container and an outlet port for discharging the refrigerant out of the container, a compressor element arranged within the container for compressing the refrigerant in the container, and a driving element arranged within the container for driving the compressor. Either of the inlet and outlet ports includes a first connecting member secured in the container so that the first connecting member forms a portion of the container. The first connecting member includes a through-hole which fluidly connects an interior and an exterior of the container, and the through-hole has an enlarged diameter portion at an outer end thereof adjacent to the exterior. A second connecting member is assembled with the first connecting member, and the second connecting member has a through-hole which is positioned coaxially with the through-hole of the first connecting member when the second connecting member is assembled with the first connecting member. A screw connects the second connecting member to the first connecting member, and a tube member is inserted in the through-hole of the second connecting member and has a peripheral flange extending outwardly at one end thereof and seated in the enlarged diameter portion of the first connecting member. An elastic ring is positioned along an inner periphery of the enlarged diameter portion to seal between the flange of the tube member and the first connecting member.

In another aspect of the present invention, the screws of the inlet and outlet ports are directed in the same direction.

According to the invention, simply by tightening one screw using a screwdriver, either of the inlet and outlet tube member can be connected with the container, allowing the compressor to be mounted without any difficulty in a restricted space under the hood of the automobile.

Also, in the case that both screws of the inlet and outlet ports are directed in the same direction, e.g., upward, the screw driver can access the screws from the direction parallel thereto, further simplifying the mounting of the compressor.

Further, the tube member is connected with the first connecting member through the elastic ring, significantly reducing the vibration which would be transmitted from the engine unit. This further reduces the possible fatigue failure of the tube, preventing the leakage of the refrigerant.

BRIEF DESCRIPTION OF THE DRAWINGS

A preferred embodiment of the invention is described below by referring to the drawings in which.

DETAILED DESCRIPTION OF THE PREFERRED EMBODIMENTS

Figure 1:
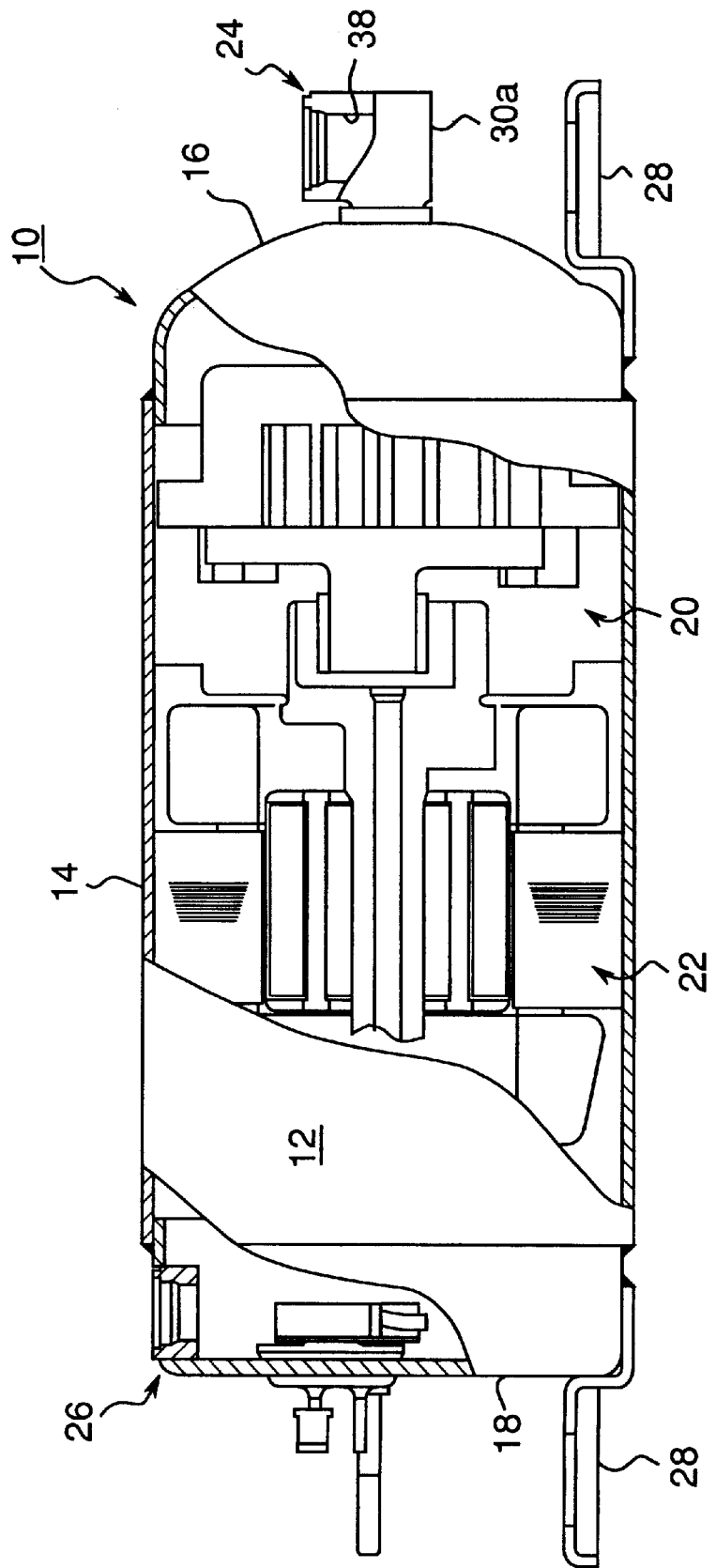
FIG. 1 is a side elevational view of an electric compressor for use with an automotive air-conditioner of the present invention in which a portion of a container is cut-away therefrom.

With reference to the drawings, particularly in FIG. 1, there is shown an automotive hermetic compressor for use with an air-conditioner, generally indicated by reference numeral 10. The compressor 10 includes an enclosed container 12. The container 12, constructed of a cylindrical member 14 and two shell members 16, 18 welded at opposite ends of the cylindrical member 14, respectively, includes a compressor element 20 for compressing a compressive medium or refrigerant, and a motor element 22 for driving the compressor element 20. Preferably, both cylindrical and shell members are made of stainless steel. Also, the container 12 has an inlet port 24 on one side near the compressor element 20 for drawing the refrigerant into the container 12, and an outlet port 26 on the other side near the motor element 22 for discharging the refrigerant out of the container 12.

Therefore, the refrigerant will be drawn through the inlet port 24 into the container, compressed by the compressor element 20, passed near the motor element 22, and finally discharged through the outlet port 26 to an air-conditioner (not shown). The container 12 further has a plurality of fixing members 28 at a bottom portion thereof so that the compressor 10 can be secured within an automobile through the fixing members 28.

Figure 2:
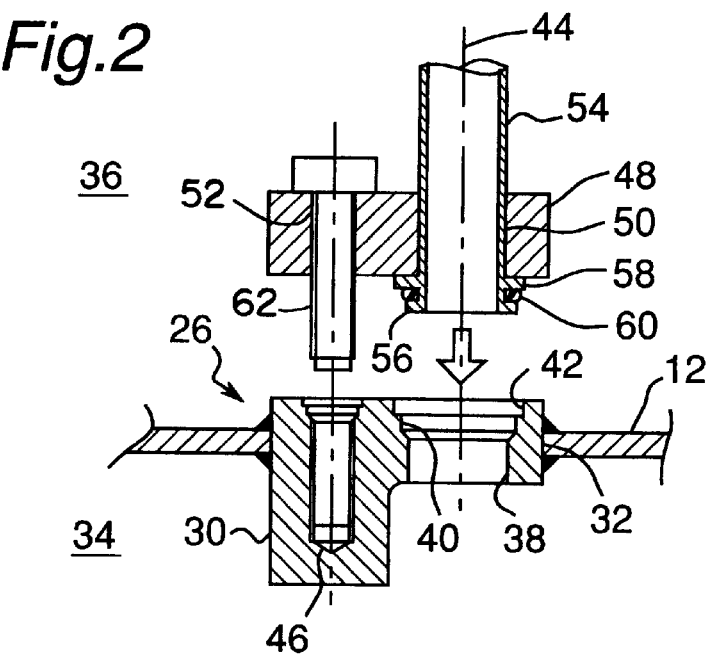
FIG. 2 is an exploded sectional view of an inlet port of the electric compressor of the present invention.
Figure 3:
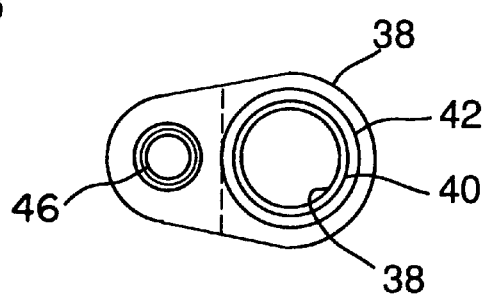
FIG. 3 is a plan view of a connector of the inlet port shown in FIG. 2.
Figure 4:
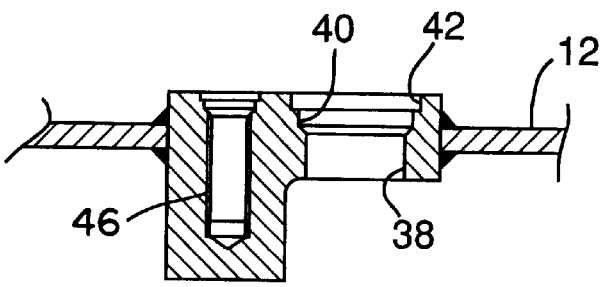
FIG. 4 is a sectional view of the connector mounted in the container.
Figure 5:
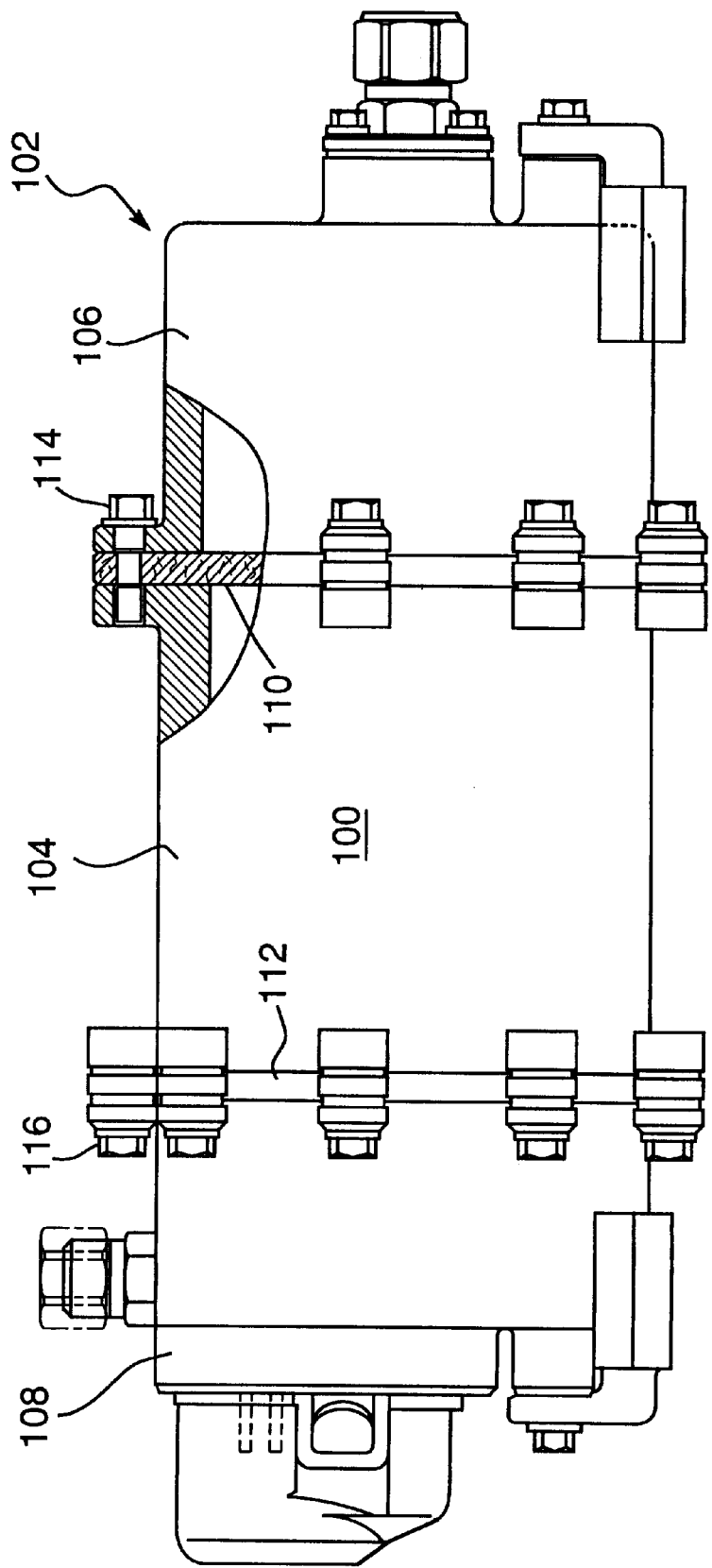
FIG. 5 is a side elevational view of a prior art semi-hermetic compressor in which a portion of the container is cut-away therefrom.
Figure 6:
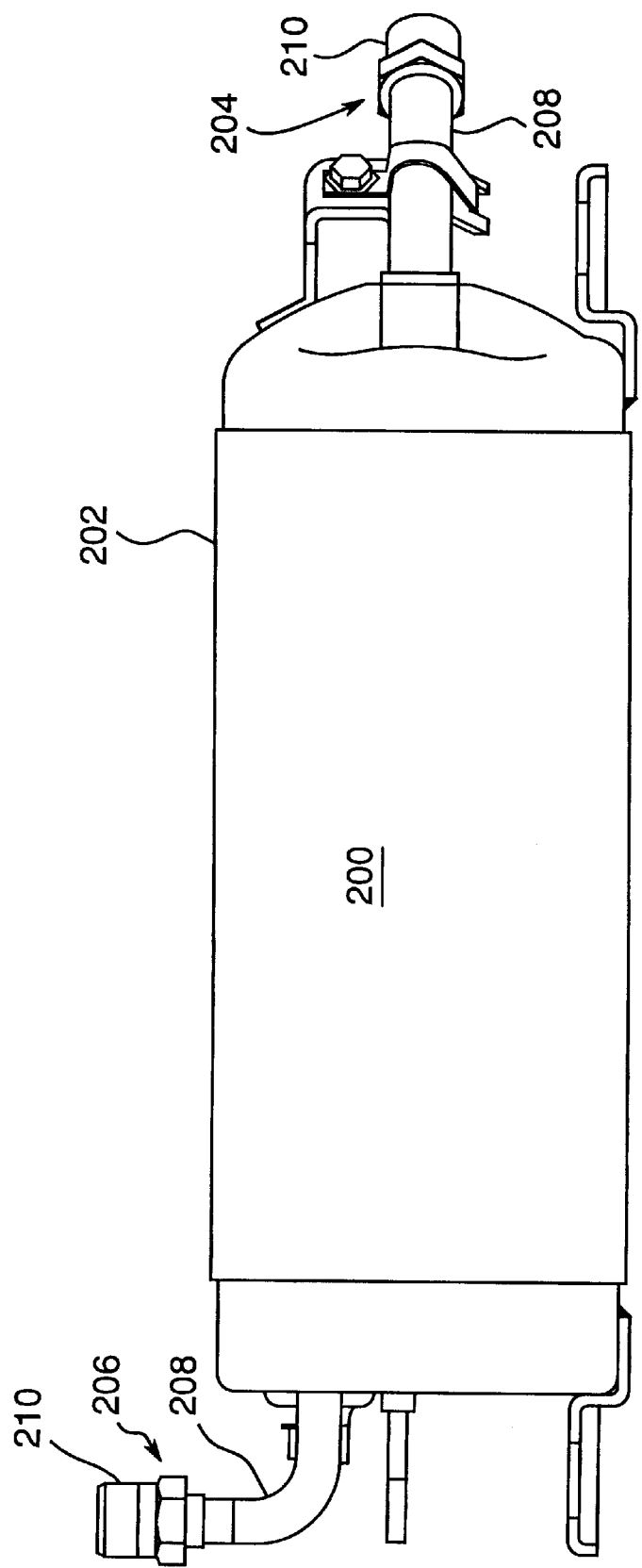
FIG. 6 is a side elevational view of a prior art enclosed compressor.

As shown in FIGS. 2 to 4, the outlet port 26 has a connector 30, i.e., first connecting member. The connector 30, which is preferably made of the same material as that of container 12, is arranged in an opening 32 formed in the container 12 by cutting a portion of the container 12 away therefrom, and is then welded therearound continuously to the container 12. The connector 30 includes a through-hole 38 which connects an interior 34 of the container 12 to an exterior 36 thereof. The through-hole 38 is enlarged in diameter at one end adjacent the exterior 36 to form an inner enlarged portion 40 (inner step) and an outer enlarged portion 42 (outer step) located outside the inner enlarged portion 40 (thus, creating shoulders). In addition, the connector 30 includes a threaded hole 46 substantially parallel to a longitudinal axis 44 of the through hole 40.

A flange block 48, i.e., second connecting member, to be assembled to the connector 30, is formed with a first through-hole 50 and a second through-hole 52 in parallel relationship with each other. It should be noted that a distance between the two centers of the through-holes 50, 52 is designed to be equal to that between the through-hole 38 and the threaded hole 46, A tube 54, i.e., tube member, for discharging the refrigerant, preferably made of aluminum, has an outer diameter which is substantially identical to that of the through-hole 50 and is passed through the through-hole 50. One end portion of the tube 54 protruded from the through-hole 50 has a first flange 56 and a second flange 58 spaced a distance away from the first flange 56. The flanges are formed continuously and integrally around the outer periphery of the tube 54. A ring 60, preferably made of elastic material such as rubber and synthetic resin, is fitted around the tube 54 between the first and second flanges 56, 58. It should be noted that the outer diameter of the first and second flanges 56, 58 are substantially equal to or slightly smaller than the inner diameters of the inner enlarge portion 40 (inner step) and outer enlarged portion 42 (outer step) of the connector 30, respectively.

The flange block 48, which holds one end of the tube 54 as described, is mounted on connector 30 with the through-holes 50, 52 positioned on the through-hole 38 and the threaded hole 46, respectively. This causes the flanges 56, 58 to be positioned within the inner and outer enlarged portions (steps) 40, 42, respectively, and the ring 60 to form a continuous contact with the inner periphery of the inner enlarged portion 40, so as to create an air-tight seal between the through-hole 38 and the tube 54. Next, a screw 62 is tightened down in the threaded hole 46 via through-hole 52, fixing the flange block 48 on the connector 30. This causes the ring 60 to be biased against the through-hole 38 and the tube 54, so that a positive seal is formed therebetween.

Referring again to FIG. 1, the inlet port 24 has a similar structure to that of the outlet port 26 except that a configuration of the connector 30a is somewhat different from the corresponding connector 30 of the outlet port 26 and therefore a detailed description of the inlet port 24 will be omitted from this specification. Also, in this embodiment, the outer end of the through-hole 30a formed in the connector 38a is directed upward and therefore an associated tube is fixedly connected thereto simply by tightening the screw down the threaded hole, as described in the assembling of the inlet 26.

As can be seen from the foregoing description, with the compressor of the present invention, simply by tightening one screw using a screw driver, either of the inlet and outlet tube can be connected with the container, allowing the compressor to be mounted without any difficulty in a restricted space under the hood of the automobile.

Also, in the case that both screws of the inlet and outlet ports are directed in the same direction, the screw driver can access the screws from the direction parallel thereto, further simplifying the mounting of the compressor.

Further, the tube is connected with the connector through the elastic ring, significantly reducing the vibration which would be transmitted from the engine unit. This reduces the possible fatigue failure of the tube, preventing the leakage of the refrigerant.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A hermetic compressor comprising:
   an enclosed metal container having an inlet port for drawing a refrigerant into said container and an outlet port for discharging the refrigerant out of said container;
   a compressor element arranged within said container for compressing the refrigerant in said container; and
   a driving element arranged within said container for driving said compressor element;
   wherein at least one of said inlet port and said outlet port comprises a tube connecting member, said tube connecting member including:
      a first connecting member secured to said container, said first connecting member including a through-hole having an exterior end open to an exterior of said container and an interior end open to an interior of said container so as to fluidly connect said exterior of said container and said interior of said container, said through-hole having an enlarged-diameter portion at said exterior end;
      a second connecting member coupled to said first connecting member, said second connecting member having a through-hole coaxially aligned with said through-hole of said first connecting member;
      a tube member extending through said through-hole of said second connecting member and having a connection end and a free end, said connection end having a peripheral flange extending radially therefrom, said peripheral flange being arranged so as to seat in said enlarged-diameter portion of said through-hole of said first connecting member;

an elastic ring positioned along an outer periphery of said peripheral flange of said tube member and engaging an inner periphery of said enlarged-diameter portion so as to form a seal between said peripheral flange of said tube member and said first connecting member; and a screw connecting said second connecting member and said first connecting member.

2. The compressor of claim 1, wherein said tube connecting member comprises a single screw.

3. The compressor of claim 1, wherein said inlet port and said outlet port comprise tube connecting members.

4. The compressor of claim 3, wherein said screw of said tube connecting member of said inlet port and said screw of said tube connecting member of said outlet port are arranged so as to extend in the same direction.

* * * * *